(12) United States Patent
Zhang et al.

(10) Patent No.: US 11,822,382 B2
(45) Date of Patent: Nov. 21, 2023

(54) FLAT-PANEL DISPLAY DEVICE, SOUND GENERATING DEVICE AND ELECTRONIC DEVICE

(71) Applicant: OnePlus Technology (Shenzhen) Co., Ltd., Guangdong (CN)

(72) Inventors: Yong Zhang, Guangdong (CN); Jin Hu, Guangdong (CN); Xiaodong Huang, Guangdong (CN); Yong Yang, Guangdong (CN); Yajun Yu, Guangdong (CN); Shunming Huang, Guangdong (CN)

(73) Assignee: OnePlus Technology (Shenzhen) Co., Ltd., Shenzhen (CN)

( * ) Notice: Subject to any disclaimer, the term of this patent is extended or adjusted under 35 U.S.C. 154(b) by 178 days.

(21) Appl. No.: 17/573,196

(22) Filed: Jan. 11, 2022

(65) Prior Publication Data
US 2022/0129032 A1   Apr. 28, 2022

Related U.S. Application Data

(63) Continuation of application No. PCT/CN2020/105219, filed on Jul. 28, 2020.

(30) Foreign Application Priority Data

Aug. 12, 2019   (CN) .......................... 201910740370.1

(51) Int. Cl.
*H04R 25/00* (2006.01)
*G06F 1/16* (2006.01)
(Continued)

(52) U.S. Cl.
CPC ........... *G06F 1/1605* (2013.01); *H04R 1/025* (2013.01); *H04R 1/028* (2013.01); *H04R 1/403* (2013.01); *H04R 2201/405* (2013.01)

(58) Field of Classification Search
CPC ........ H04R 1/2873; H04R 1/02; H04R 1/023; H04R 5/02; H04R 2201/021;
(Continued)

(56) References Cited

U.S. PATENT DOCUMENTS

| | | | |
|---|---|---|---|
| 6,527,237 B2 * | 3/2003 | Harary | H04R 1/026 248/221.11 |
| 6,997,525 B2 | 2/2006 | Gillengerten | |
| 2013/0070944 A1 | 3/2013 | Lee | |

FOREIGN PATENT DOCUMENTS

| | | |
|---|---|---|
| CN | 2904535 Y | 5/2007 |
| CN | 104565720 A | 4/2015 |

(Continued)

OTHER PUBLICATIONS

European search report for European Application No. 20851751.6, dated Jul. 28, 2022 (9 pages).
(Continued)

*Primary Examiner* — Amir H Etesam
(74) *Attorney, Agent, or Firm* — Young Basile Hanlon & MacFarlane, P.C.

(57) ABSTRACT

A flat-panel display device described herein includes a display screen; a display backplate; a chassis slidably arranged on the display backplate; a fixing support, a motion module arranged on the chassis, wherein the motion module includes a first telescopic assembly and a second telescopic assembly arranged on the fixing support; a first speaker arranged on the chassis; and a second speaker connected to the second telescopic assembly. The first telescopic assembly is matched with the display backplate and configured to drive the chassis, the first speaker, the second speaker and the second telescopic assembly to move back and forth in a first direction relative to the display backplate. The second telescopic assembly is configured to drive the second
(Continued)

speaker to move back and forth in a second direction relative to the display backplate and the first speaker.

20 Claims, 8 Drawing Sheets

(51) Int. Cl.
    *H04R 1/02*     (2006.01)
    *H04R 1/40*     (2006.01)

(58) Field of Classification Search
    CPC .. H04R 2499/11; H04R 2499/15; H04R 1/24; H04R 1/2811
    See application file for complete search history.

(56) References Cited

FOREIGN PATENT DOCUMENTS

| CN | 106373276 A | 2/2017 |
|---|---|---|
| CN | 107183978 A | 9/2017 |
| CN | 108630034 A | 10/2018 |
| CN | 109348153 A | 2/2019 |
| CN | 109493765 A | 3/2019 |
| CN | 109756814 A | 5/2019 |
| CN | 109769098 A | 5/2019 |
| CN | 109889745 A | 6/2019 |
| CN | 110599933 A | 12/2019 |

OTHER PUBLICATIONS

Indian First Examination Report for Indian Application No. 202217011258 dated Aug. 5, 2022 (6 pages).
Chinese First Office Action with English Translation for CN Application 201910740370.1 dated Dec. 25, 2020. (22 pages).
Chinese Notification to Grant Patent Right for Invention with English Translation for CN Application 201910740370.1 dated Aug. 4, 2021. (6 pages).
International Search Report with English Translation for PCT Application PCT/CN2020/105219 dated Oct. 30, 2020. (15 pages).

* cited by examiner

FLAT-PANEL DISPLAY DEVICE, SOUND GENERATING DEVICE AND ELECTRONIC DEVICE

CROSS-REFERENCE TO RELATED APPLICATION(S)

The present disclosure is a continuation-application of International Patent Application No. PCT/CN2020/105219 filed Jul. 28, 2020, which claims foreign priority of Chinese Patent Application No. 201910740370.1, filed on Aug. 12, 2019, the contents of both of which are hereby incorporated by reference.

TECHNICAL FIELD

The present disclosure relates to the field of display technologies, and in particular, to a flat-panel display device.

BACKGROUND

Flat-panel display devices at least include a liquid crystal TV, a plasma TV, an organic electroluminescent diode TV, a liquid crystal display and other kinds of display devices. Traditional speakers can be divided into a type vocalizing forward, a type vocalizing downward and a type vocalizing backward; the type vocalizing forward can achieve a best sound quality effect, followed by the type vocalizing downward, and the type vocalizing backward bears a worst effect. Therefore, when designing a sound output position of a speaker, a forward vocal position is usually chosen. Because a speaker vocalizing forward is fixed at a bottom of a display screen, the speaker occupies a large space and cannot achieve a simple appearance.

Therefore, a telescopic speaker appears in traditional technologies, and a top-down reciprocating telescopic speaker is widely used. However, since the speaker extends out by a large distance from a front of the display screen, an appearance effect is not good. Another kind of reciprocating telescopic speaker is used, wherein when sound is needed, the speaker moves vertically downward first, and then obliquely forward. Due to a large motion mechanism and motion space, the appearance is not concise enough.

SUMMARY

Based on the above, it is necessary to provide a flat-panel display device for problems of large motion space and insufficient simplicity of appearance of speakers.

In a first aspect, a flat-panel display device is provided in the present disclosure. The flat-panel display device includes a display screen, a display backplate, a chassis, a fixing support, a motion module, a first speaker, and a second speaker. The display backplate is stacked on the display screen. The chassis is slidably arranged on the display backplate. The fixing support is arranged on the chassis. The motion module is arranged on the chassis. The motion module includes a first telescopic assembly and a second telescopic assembly arranged on the fixing support. A telescopic direction of the first telescopic assembly is defined as a first direction. A telescopic direction of the second telescopic assembly is defined as a second direction, and the first direction is perpendicular to the second direction. The first speaker is arranged on the chassis. The second speaker is connected to the second telescopic assembly. The first telescopic assembly is matched with the display backplate. The first telescopic assembly is configured to drive the chassis, the first speaker. The second speaker and the second telescopic assembly to move back and forth in the first direction relative to the display backplate. The second telescopic assembly is configured to drive the second speaker to move back and forth in the second direction relative to the display backplate and the first speaker.

In a second aspect, a sound generating device is provided in the present disclosure. The sound generating device includes a backplate, a chassis, a motion module, a first speaker, and a second speaker. The chassis is slidably arranged on the backplate. The chassis is provided with a fixing support. The motion module is arranged on the chassis. The motion module includes a first telescopic assembly and a second telescopic assembly arranged on the fixing support. A telescopic direction of the first telescopic assembly is defined as a first direction. A telescopic direction of the second telescopic assembly is defined as a second direction, and the first direction is perpendicular to the second direction. The first speaker is arranged on the chassis. A second speaker is connected to the second telescopic assembly. The first telescopic assembly is matched with the backplate, and the first telescopic assembly is configured to drive the chassis, the first speaker, the second speaker and the second telescopic assembly to move back and forth in the first direction relative to the backplate. The second telescopic assembly is configured to drive the second speaker to move back and forth in the second direction relative to the display backplate and the first speaker. The first telescopic assembly includes a first motor arranged on the fixing support, a lead screw arranged on the fixing support and driven by the first motor, and a nut matched with the lead screw and fixed on the display backplate. The lead screw moves in the first direction relative to the nut in response to the first motor driving the lead screw to rotate. The second telescopic assembly includes a second motor arranged on the fixing support, a cam driven by the second motor, a driving rod fixed on the cam and extending parallel to an axle direction of the cam, and a motion support connected with the driving rod. The second speaker is fixed to the motion support. The driving rod drives the motion support and the second speaker to move along the second direction in response to the second motor driving the cam to rotate.

In a third aspect, an electronic device is provided in the present disclosure. The electronic device includes a flat-panel display device. The flat-panel display device includes a display backplate, a display screen, a chassis, a motion module, a first speaker, and a second speaker. The display screen is stacked on the display backplate. The chassis is slidably arranged on the display backplate and between the display screen and the display backplate. The motion module is arranged on the chassis and includes a first telescopic assembly and a second telescopic assembly. The first speaker is arranged on the chassis. The second speaker is connected to the second telescopic assembly. The first telescopic assembly is configured to drive the chassis, the first speaker, the second speaker and the second telescopic assembly to move back and forth in a first direction relative to the display backplate. The second telescopic assembly is configured to drive the second speaker to move back and forth in a second direction relative to the display backplate and the first speaker. The first direction is perpendicular to the second direction.

BRIEF DESCRIPTION OF DRAWINGS

In order to make the technical solution described in the embodiments of the present disclosure or prior art more clearly, the drawings used for the description of the embodiments will be briefly described. Apparently, the drawings described below are only for illustration, but not for limitation. One skilled in the art may obtain other drawings based on these drawings, without making any inventive work.

DETAILED DESCRIPTION

Figure 1:
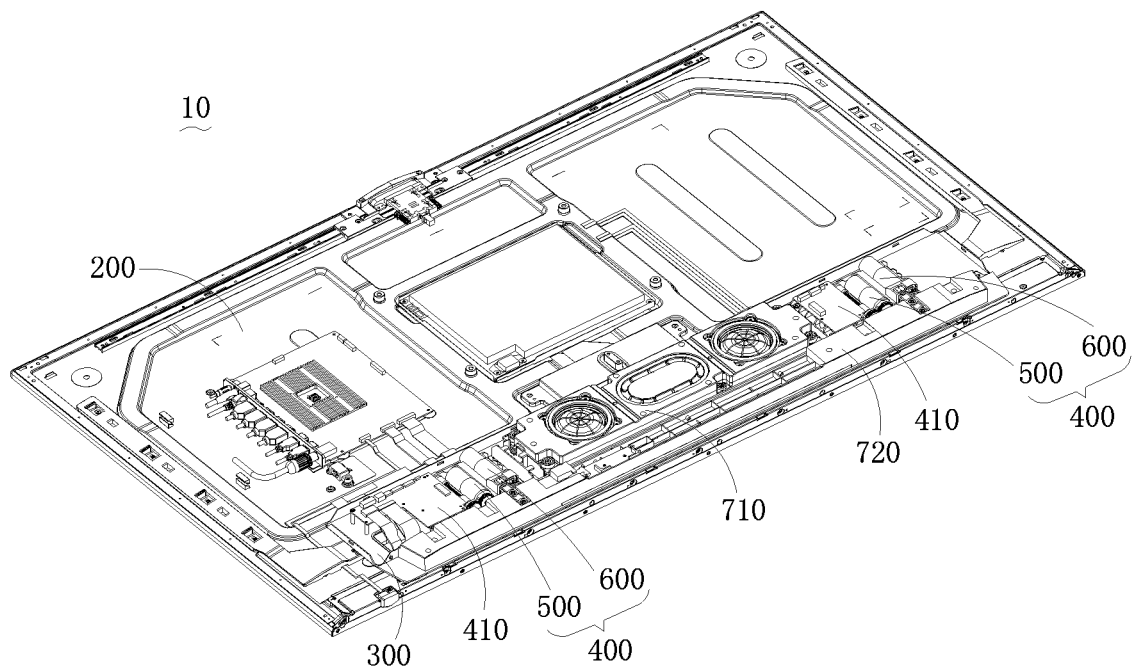
FIG. 1 is a schematic rear view of a flat-panel display device provided by some embodiments of the present disclosure.
Figure 2:
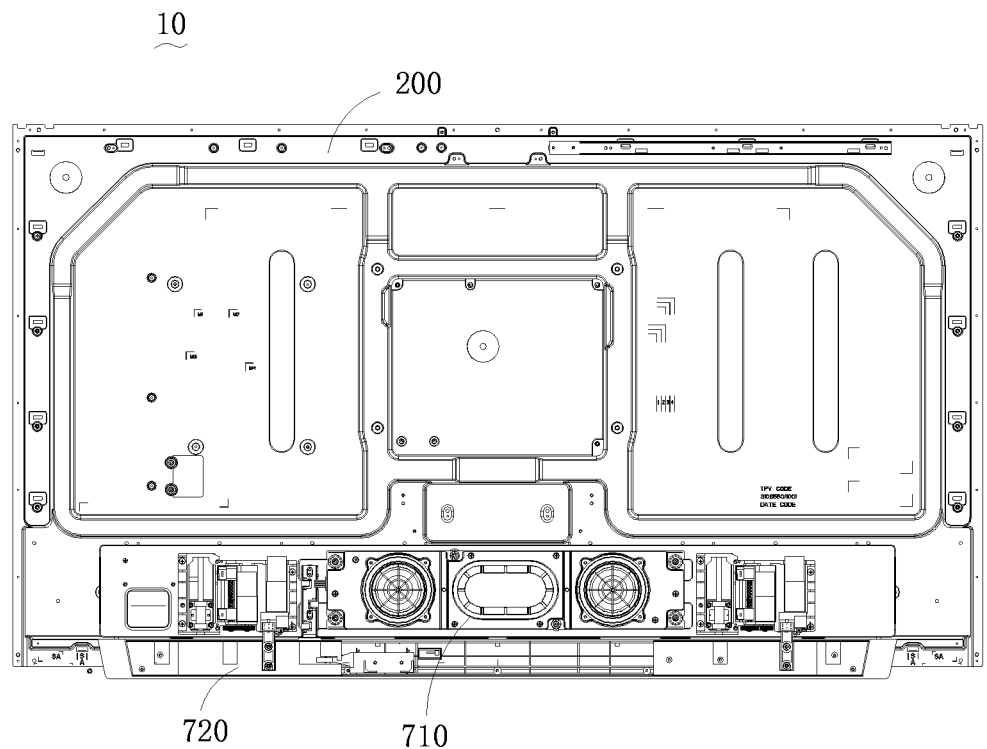
FIG. 2 is another schematic rear view of a flat-panel display device provided by some embodiments of the present disclosure.
Figure 3:
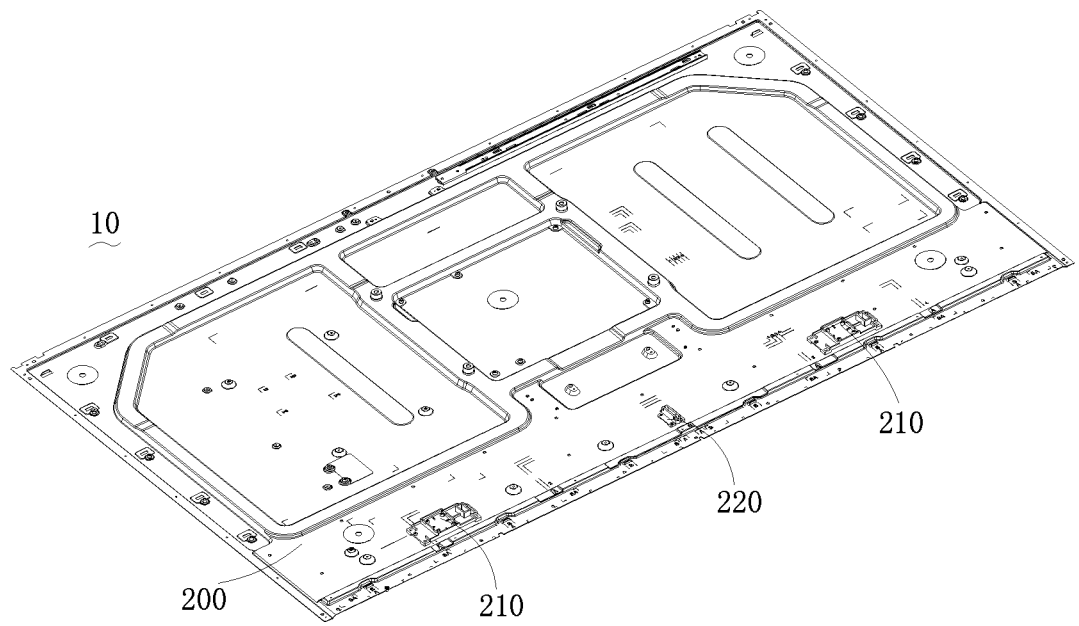
FIG. 3 is a schematic rear view of a flat-panel display device free of a chassis provided by some embodiments of the present disclosure.

In order to make the purpose, technical scheme and advantages of the present disclosure clearer, the present disclosure will be described more fully below with reference to the relevant drawings and embodiments. Many details are set forth below to facilitate a full understanding of the present disclosure. However, the disclosure can be implemented in many other ways than those described herein, and similar improvements can be made by those skilled in the art without contradicting the concept of the present disclosure. It should be understood that the described embodiments are used only to explain the present disclosure and are not used to limit the present disclosure.

It is understood that the terms "first", "second" and the like in the present disclosure are used to describe various components but these components are not limited by these terms. These terms are only used to distinguish a component from another component, rather than to be understood as indicating or implying relative importance or implicitly indicating the number of technical features indicated. Thus, features defined as "first" and "second" may indicate or implicitly indicate including at least one of the features. In the description of the present disclosure, "multiple" means at least two, such as two, three and so on, unless otherwise specified.

It should be noted that when a component is "arranged in/on" another component, the component can be arranged directly in/on another component or there can be a component in middle. When a component is "connected" to another component, the component can be directly connected to another component or there may be a middle component therein at the same time.

Unless otherwise defined, all technical and scientific terms used herein have the same meanings as those commonly understood by those skilled in the technical field of the present disclosure. Terms used in the description of the present disclosure herein are only for the purpose of describing specific embodiments and are not intended to limit the present disclosure. The term "and/or" as used herein includes any and all combinations of one or more related listed items.

In some embodiments, a flat-panel display device includes a display screen, a display backplate, a chassis, a fixing support, a motion module, a first speaker, and a second speaker. The display backplate is stacked on the display screen. The chassis is slidably arranged on the display backplate. The fixing support is arranged on the chassis. The motion module is arranged on the chassis. The motion module includes a first telescopic assembly and a second telescopic assembly arranged on the fixing support. A telescopic direction of the first telescopic assembly is defined as a first direction. A telescopic direction of the second telescopic assembly is defined as a second direction, and the first direction is perpendicular to the second direction. The first speaker is arranged on the chassis. The second speaker is connected to the second telescopic assembly. The first telescopic assembly is matched with the display backplate. The first telescopic assembly is configured to drive the chassis, the first speaker. The second speaker and the second telescopic assembly to move back and forth in the first direction relative to the display backplate. The second telescopic assembly is configured to drive the second speaker to move back and forth in the second direction relative to the display backplate and the first speaker.

Alternatively, the first telescopic assembly includes a first motor arranged on the fixing support, and a lead screw arranged on the fixing support and driven by the first motor. A nut matched with the lead screw is fixed on the display backplate. The lead screw moves in the first direction relative to the nut in response to the first motor driving the lead screw to rotate.

Alternatively, the first motor has a first output shaft and a first gear driven by the first output shaft. The first telescopic assembly includes a second gear arranged on the lead screw, and the first gear is meshed with the second gear.

Alternatively, at least part of the first output shaft is a first non-circular shaft. The first gear defines a first non-circular hole matched with the first non-circular shaft. At least part of the lead screw is a second non-circular shaft, and the second gear defines a second non-circular hole matched with the second non-circular shaft.

Alternatively, a side of the first output shaft extending out of the first non-circular hole defines a first clamping groove. A first circlip is arranged within and matched with the first clamping groove. The first circlip butts against an end face of the first gear. A side of the lead screw extending out of the second non-circular hole defines a second clamping groove. A second circlip is arranged within and matched with the second clamping groove. The second circlip butts against an end face of the second gear.

Alternatively, the flat-panel display device further includes a whole machine connecting support arranged on the display backplate. The nut is fixed to the display backplate through the whole machine connecting support.

Alternatively, the nut has a clamping part. The whole machine connecting support has a receiving part for receiving the clamping part. The clamping part is fixed to the receiving part.

Alternatively, the nut is further provided with a first retaining rib. The fixing support is provided with a first sensor. The first sensor is blocked by the first retaining rib when moving to a position of the first retaining rib.

Alternatively, the first telescopic assembly further includes a positioning shaft extending along the first direction and arranged on the fixing support. The nut defines a positioning hole extending along the first direction, and the positioning shaft passes through the positioning hole.

Alternatively, the first telescopic assembly further includes a first shaft extending along the first direction and arranged on the fixing support. The whole machine connecting support is fixed with a first bearing extending along the first direction. The first shaft passes through the first bearing.

Alternatively, the second telescopic assembly includes a second motor arranged on the fixing support, a cam driven by the second motor, a driving rod fixed on the cam and extending parallel to an axle direction of the cam, and a motion support connected with the driving rod. The second speaker is fixed to the motion support. The driving rod drives the motion support and the second speaker to move along the second direction in response to the second motor driving the cam to rotate.

Alternatively, the second telescopic assembly further includes a second shaft extending along the second direction and arranged on the fixing support. The motion support is provided with a second bearing extending along the second direction, and the second shaft passes through the second bearing.

Alternatively, a buffer is arranged at a connection between the motion support and the second speaker.

Alternatively, the motion support is provided with a second retaining rib, the fixing support is provided with a second sensor, and the second retaining rib blocks the second sensor when moving to a position of the second sensor.

Alternatively, the motion module includes a plurality of motion modules. Each of the plurality of motion modules is configured with a control board to drive a corresponding motion module.

In some embodiments, a sound generating device is provided by the present disclosure. The sound generating device includes a backplate, a chassis, a motion module, a first speaker, and a second speaker. The chassis is slidably arranged on the backplate. The chassis is provided with a fixing support. The motion module is arranged on the chassis. The motion module includes a first telescopic assembly and a second telescopic assembly arranged on the fixing support. A telescopic direction of the first telescopic assembly is defined as a first direction. A telescopic direction of the second telescopic assembly is defined as a second direction, and the first direction is perpendicular to the second direction. The first speaker is arranged on the chassis.

A second speaker is connected to the second telescopic assembly. The first telescopic assembly is matched with the backplate, and the first telescopic assembly is configured to drive the chassis, the first speaker, the second speaker and the second telescopic assembly to move back and forth in the first direction relative to the backplate. The second telescopic assembly is configured to drive the second speaker to move back and forth in the second direction relative to the display backplate and the first speaker. The first telescopic assembly includes a first motor arranged on the fixing support, a lead screw arranged on the fixing support and driven by the first motor, and a nut matched with the lead screw and fixed on the display backplate. The lead screw moves in the first direction relative to the nut in response to the first motor driving the lead screw to rotate. The second telescopic assembly includes a second motor arranged on the fixing support, a cam driven by the second motor, a driving rod fixed on the cam and extending parallel to an axle direction of the cam, and a motion support connected with the driving rod. The second speaker is fixed to the motion support. The driving rod drives the motion support and the second speaker to move along the second direction in response to the second motor driving the cam to rotate.

In some embodiments, an electronic device is provided by the present disclosure. The electronic device includes a flat-panel display device. The flat-panel display device includes a display backplate, a display screen, a chassis, a motion module, a first speaker, and a second speaker. The display screen is stacked on the display backplate. The chassis is slidably arranged on the display backplate and between the display screen and the display backplate. The motion module is arranged on the chassis and includes a first telescopic assembly and a second telescopic assembly. The first speaker is arranged on the chassis. The second speaker is connected to the second telescopic assembly. The first telescopic assembly is configured to drive the chassis, the first speaker, the second speaker and the second telescopic assembly to move back and forth in a first direction relative to the display backplate. The second telescopic assembly is configured to drive the second speaker to move back and forth in a second direction relative to the display backplate and the first speaker. The first direction is perpendicular to the second direction.

Alternatively, the electronic device further includes a fixing support arranged on the chassis. The first telescopic assembly includes a first motor arranged on the fixing support, a lead screw arranged on the fixing support and driven by the first motor, and a nut matched with the lead screw. The nut is fixed on the display backplate. The lead screw moves in the first direction relative to the nut in response to the first motor driving the lead screw to rotate.

Alternatively, the first motor has a first output shaft and a first gear driven by the first output shaft. The first telescopic assembly includes a second gear arranged on the lead screw. The first gear is meshed with the second gear.

Alternatively, the second telescopic assembly includes a second motor arranged on the fixing support, a cam driven by the second motor, a driving rod fixed on the cam and extending parallel to an axle direction of the cam, and a motion support connected with the driving rod. The second speaker is fixed to the motion support, the driving rod drives the motion support and the second speaker to move along the second direction in response to the second motor driving the cam to rotate.

As shown in FIGS. 1 to 3 and 5 to 7, a flat-panel display device 10 is provided by some embodiments of the present disclosure. The flat-panel display device 10 includes a display screen 100, a display backplate 200, a chassis 300, a fixing support 310, a motion module 400, a first speaker 710 and a second speaker 720. The display backplate 200 is stacked on the display screen 100. The chassis 300 is slidably arranged on the display backplate 200. The motion module 400 is arranged on the chassis 300, and includes a first telescopic assembly 500 and a second telescopic assembly 600 arranged on the fixing support 310. A telescopic direction of the first telescopic assembly 500 is defined as a first direction, a telescopic direction of the second telescopic assembly 600 is defined as a second direction, and the first direction is perpendicular to the second direction. The first speaker 710 is arranged on the chassis 300. The second speaker 720 is connected to the second telescopic assembly 600. The first telescopic assembly 500 is matched with the display backplate 200, and the first telescopic assembly 500 can drive the chassis 300, the first speaker 710, the second speaker 720 and the second telescopic assembly 600 to move back and forth in the first direction relative to the display backplate 200. The second telescopic assembly 600 can drive the second speaker 720 to move back and forth in the second direction relative to the display backplate 200 and the first speaker 710.

It should be noted that the flat-panel display device 10 includes, but is not limited to, plural types of display devices such as a liquid crystal television, a plasma television, an organic electroluminescent diode television, a liquid crystal display, and the like. According to a placement posture shown in FIG. 6 and FIG. 7, the first direction is an up and down direction in traditional sense, that is, an up-down direction in FIG. 6 and FIG. 7. The second direction is a front-rear direction in the traditional sense, that is, a left-right direction in FIG. 6 and FIG. 7.

Both the first speaker 710 and the second speaker 720 are equipped with loudspeakers for making sounds. The first speaker 710 may sound backward, the second speaker 720 may sound forward, or may sound downward at the same time. In addition, the chassis 300 is also provided with a first housing hiding the motion module 400 and the first speaker 710, the second speaker 720 is also provided with a second housing hiding components such as the loudspeakers and the like. The first housing and the second housing are clamped together. When the first speaker 710 and the second speaker 720 move in the first direction at the same time, the first housing and the second housing move at the same time. When the first speaker 710 reaches a preset position and the second speaker 720 moves in the second direction, the second housing does not move, and the second speaker 720 separates from the second housing, presenting a complete appearance.

Figure 6:
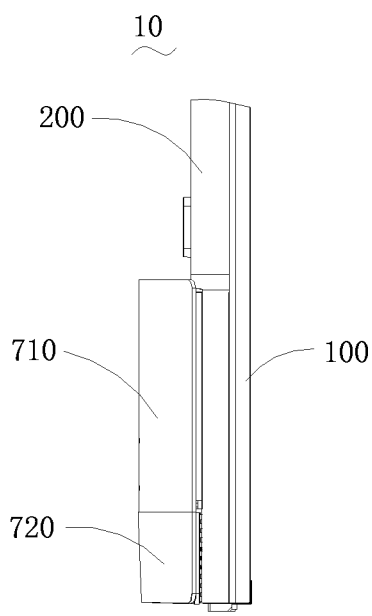
FIG. 6 is a side view of a speaker of a flat-panel display device provided by some embodiments of the present disclosure, before moving.

As shown in FIG. 6, when the first speaker 710 and the second speaker 720 are not working, they are both arranged on one side of the display backplate 200. The first speaker 710 and the second speaker 720 are not visible from one side of the display screen 100, without affecting appearance of the flat-panel display device 10 and making it look more concise.

Figure 7:
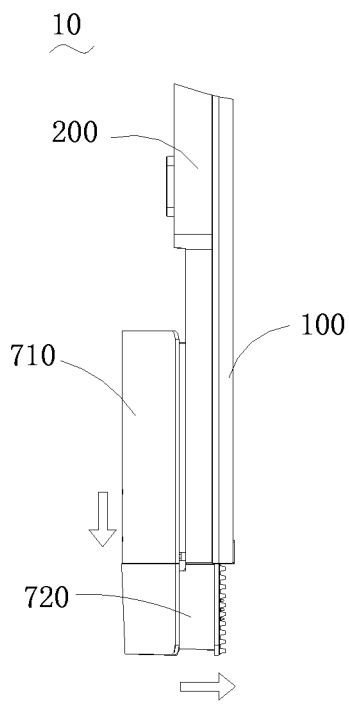
FIG. 7 is a side view of a speaker of a flat-panel display device provided by some embodiments of the present disclosure, after moving.

As shown in FIG. 7 and FIG. 1, when the first speaker 710 and the second speaker 720 need to work, first, the first telescopic assembly 500 drives the chassis 300, the first speaker 710, the second telescopic assembly 600 and the second speaker 720 to move in the first direction (downward) at the same time, until the first speaker 710 reaches the preset position, which is a position where a connection between the first speaker 710 and the second speaker 720 is substantially flush with a bottom of the display screen 100. Then, motion of the first telescopic assembly 500 is stopped and the second telescopic assembly 600 is activated. The second telescopic assembly 600 drives the second speaker 720 to move in the second direction (forward), until a sound output surface of the second speaker 720 is flush with the display screen 100. In this way, the first speaker 710 and the second speaker 720 work together to present a better sound output effect and a simple appearance.

When the first speaker 710 and the second speaker 720 need to be retracted, first, the second telescopic assembly 600 drives the second speaker 720 to retract in the second direction (backward) until reaching the preset position. Then, motion of the second telescopic assembly 600 is stopped and the motion of the first telescopic assembly 500 is started. The first telescopic assembly 500 drives the chassis 300, the first speaker 710, the second telescopic assembly 600 and the second speaker 720 to retract in the first direction (upward) at the same time until they are completely reset. In this way, the first speaker 710 and the second speaker 720 are hidden by the display backplate 200 without affecting the appearance at all.

In the embodiments, the flat-panel display device 10 can be provided with a plurality of the same motion modules 400, with a high degree of modularization, resulting in realization of mass production, further ensuring consistency and reliability of speaker motion, ensuring high motion quality, reducing shaking when subjected to external force, and ensuring that the speakers are not prong to damage by external force in a service environment. The fixing support 310 is bonded or mechanically fixed to the chassis 300. In order to improve stability of matching, the fixing support 310 is also provided with a boss arranged in a groove defined in the chassis 300. As shown in FIG. 1, the plurality of motion modules 400 are integrated on the same chassis 300, and a plurality of first telescopic assembly 500 and a plurality of second telescopic assembly 600 are integrated on the same fixing support 310, improving the space utilization and making an overall structure more compact and concise.

The first telescopic assembly 500 and the second telescopic assembly 600 control motion in the first direction and the second direction respectively, so that two moving mechanisms work together to jointly realize product functions without mutual interference and with independence, so as to improve the stability of the whole machine.

Each motion module 400 is configured with a control board 410 to drive a corresponding motion module 400. By designing control timing of the control board 410, synchronous motion of the plurality of motion modules 400 is realized, and a problem of inconsistent left and right height of the speaker during motion is solved.

According to a principle of symmetry, in order to ensure a force balance and consistency of motion, the plurality of motion modules 400 can be set into two groups respectively arranged at positions with same distance from the center of the first speaker 710. Of course, plural groups of motion modules 400 can also be set at equal intervals.

Figure 4:
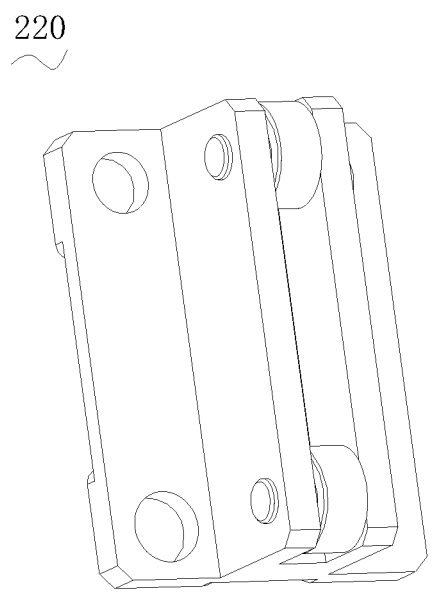
FIG. 4 is a schematic view of a rolling mechanism provided by some embodiments of the present disclosure.
Figure 5:
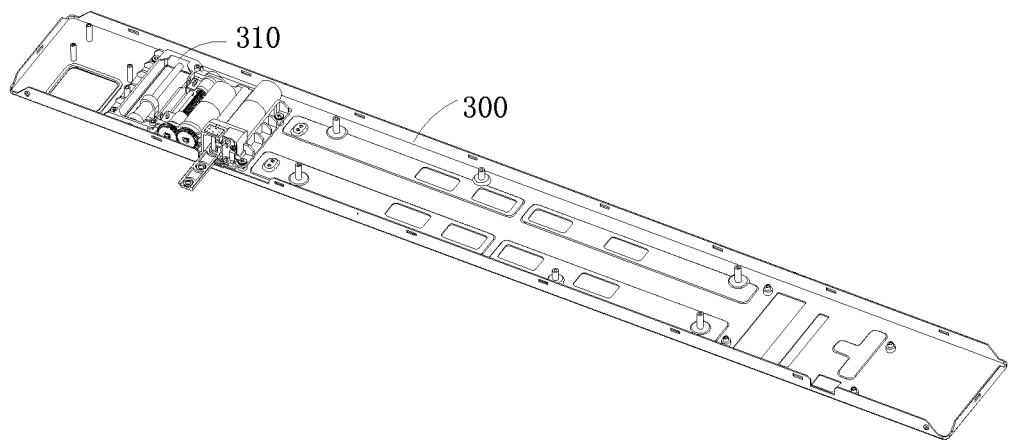
FIG. 5 is a schematic view of cooperation between a chassis and a fixing support provided by some embodiments of the present disclosure.

As shown in FIG. 4, in some embodiments, the display backplate 200 is also provided with a rolling mechanism 220. In some embodiments, the rolling mechanism 220 includes a rolling frame, a cylinder erected on the rolling frame, and a ring body sleeved on the cylinder. The ring body at least partially exceeds the rolling frame and is limited to a space defined in the rolling frame. The ring body can be in contact with the chassis 300. When the chassis 300 moves relative to the display backplate 200, the chassis 300 and the ring body are in a rolling contact, which has less friction, and also contributes to motion.

As shown in FIGS. 8 to 14, in some embodiments, the first telescopic assembly 500 includes a first motor 510 arranged on the fixing support 310, and a lead screw 520 arranged on the fixing support 310 and driven by the first motor 510. The display backplate 200 is fixed with a nut 530 matched with the lead screw 520. When the first motor 510 drives the lead screw 520 to rotate, the lead screw 520 moves in the first direction relative to the nut 530. In some embodiments, the lead screw 520 and the nut 530 are matched through threads. When one of the lead screw 520 and the nut 530 is fixed, another of the lead screw 520 and the nut 530 rotates relative to the one of the lead screw 520 and the nut 530, resulting in a relative movement. In the embodiments, the lead screw 520 can move relative to the nut 530 while rotating relative to the nut 530 by fixing the nut 530, and a moving direction is an extension direction of the lead screw 520, that is, the first direction. The nut 530 remains stationary relative to the whole machine. While moving relative to the whole machine, the lead screw 520 drives the fixing support 310 to move, and then drives the first telescopic assembly 500, the second telescopic assembly 600, the second speaker 720, the chassis 300 and the first speaker 710 to move synchronously, until the connection between the first speaker 710 and the second speaker 720 reaches the bottom of the display screen 100. The first speaker 710 and the second speaker 720 can stop at any position due to a self-locking capability of the lead screw 520, and a shaking gap is very small, ensuring better product quality. Cooperation between the lead screw 520 and the nut 530 ensures high transmission efficiency, without accumulating errors generated by the motion module 400, and avoids problems of jamming and efficiency reduction.

Figure 8:
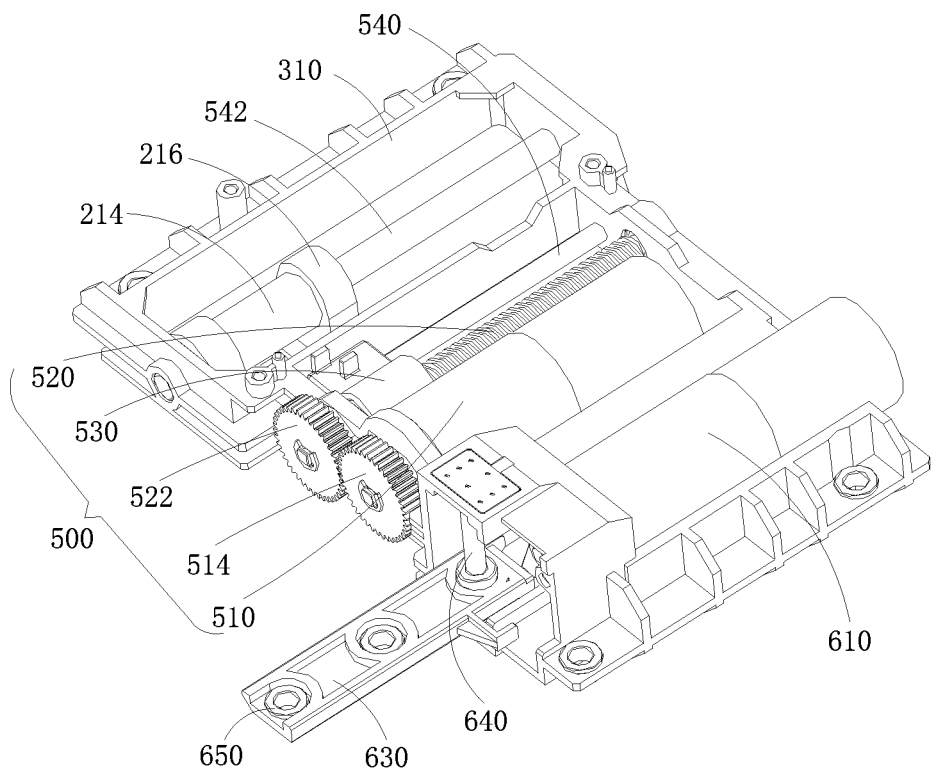
FIG. 8 is a schematic view of a fixing support and a motion module provided by some embodiments of the present disclosure.
Figure 11:
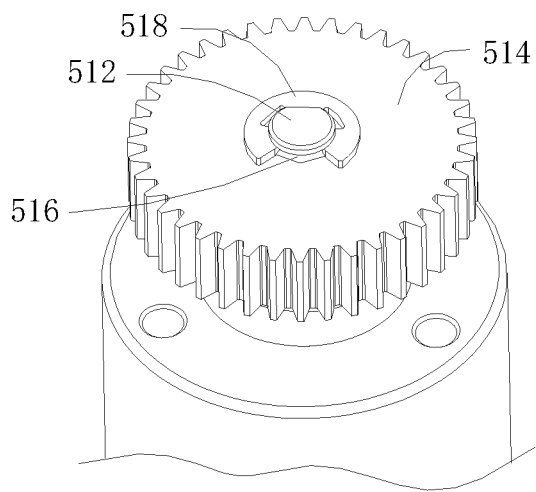
FIG. 11 is a schematic view of cooperation between a first gear and a first output shaft provided by some embodiments of the present disclosure.

A driving relationship between the first motor 510 and the lead screw 520 can adopt the following matching mode. In some embodiments, as shown in FIG. 8 and FIG. 11, the first motor 510 has a first output shaft 512 and a first gear 514 driven by the first output shaft 512, and the first gear 514 is meshed with a second gear 522 arranged on the lead screw 520. Rotation of the first output shaft 512 drives rotation of the first gear 514, the first gear 514 drives rotation of the second gear 522, and then the rotation of the second gear 522 drives the lead screw 520 to rotate. Stable and reliable transmission efficiency is ensured by meshing the first gear 514 and the second gear 522.

In order to prevent looseness and failure of cooperation between the first output shaft 512 and the first gear 514, a way of unconventional hole and unconventional shaft can be used to ensure stability and reliability of the rotation of the first gear 514 relative to the first output shaft 512. In some embodiments, at least part of the first output shaft 512 is a first non-circular shaft, and the first gear 514 defines a first non-circular hole matched with the first non-circular shaft. When the first non-circular shaft and the first non-circular hole match with each other, there will be no relative rotation between the first non-circular shaft and the first non-circular hole, ensuring reliability of the cooperation. Non circular shapes can be D-shaped, square, triangular, and other irregular shapes. In the embodiments, the first non-circular shaft adopts a D-shaped shaft, and the first non-circular hole adopts a D-shaped hole.

Similarly, in order to prevent looseness and failure of cooperation between the lead screw 520 and the second gear 522, a way of unconventional hole and unconventional shaft can be used to ensure stability and reliability of the rotation of the second gear 522 relative to the lead screw 520. In some embodiments, at least part of the lead screw 520 is a second non-circular shaft, and the second gear 522 defines a second non-circular hole matched with the second non-circular shaft. When the second non-circular shaft and the second non-circular hole match with each other, there will be no relative rotation between the second non-circular shaft and the second non-circular hole, ensuring reliability of the cooperation. Non circular shapes can be D-shaped, square, triangular, and other irregular shapes. In the embodiments, the second non-circular shaft adopts a D-shaped shaft, and the second non-circular hole adopts a D-shaped hole.

In order to reduce looseness of cooperation between the first output shaft 512 and the first gear 514 and falling off of the first gear 514, locking between the first output shaft 512 and the first gear 514 can be realized by using a circlip. In some embodiments, as shown in FIG. 11, a side of the first output shaft 512 extending out of the first gear 514 defines a first clamping groove 516, the first clamping groove 516 is matched with a first circlip 518, and the first circlip 518 butts against an end face of the first gear 514. It can be understood that the first circlip 518 butts against a surface of the first gear 514 away from the first motor 510. The first circlip 518 can be C-shaped, E-shaped or U-shaped. In the embodiments, the first circlip 518 adopts a E-shaped circlip.

Similarly, in order to reduce looseness of cooperation between the lead screw 520 and the second gear 522 and falling off of the second gear 522, locking between the lead screw 520 and the second gear 522 can be realized by using a circlip. In some embodiments, a side of the lead screw 520 extending out of the second gear 522 defines a second clamping groove, the second clamping groove is matched with a second circlip, and the second circlip butts against an end face of the second gear 522. It can be understood that the second circlip butts against a surface of the second gear 522 away from the lead screw 520. The second circlip can be C-shaped, E-shaped or U-shaped. In this embodiment, the second circlip adopts a E-shaped circlip.

Figure 12:
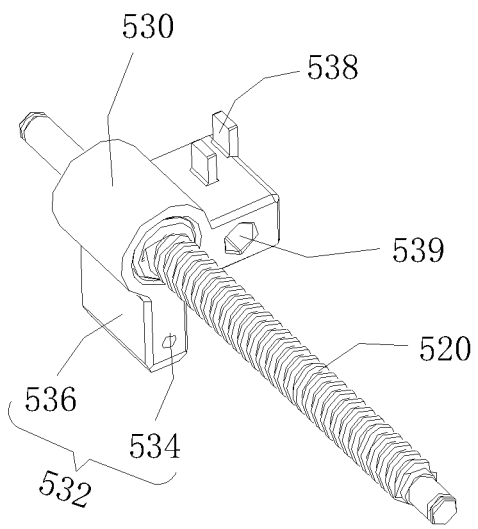
FIG. 12 is a schematic view of cooperation between a lead screw and a nut provided by some embodiments of the present disclosure.
Figure 13:
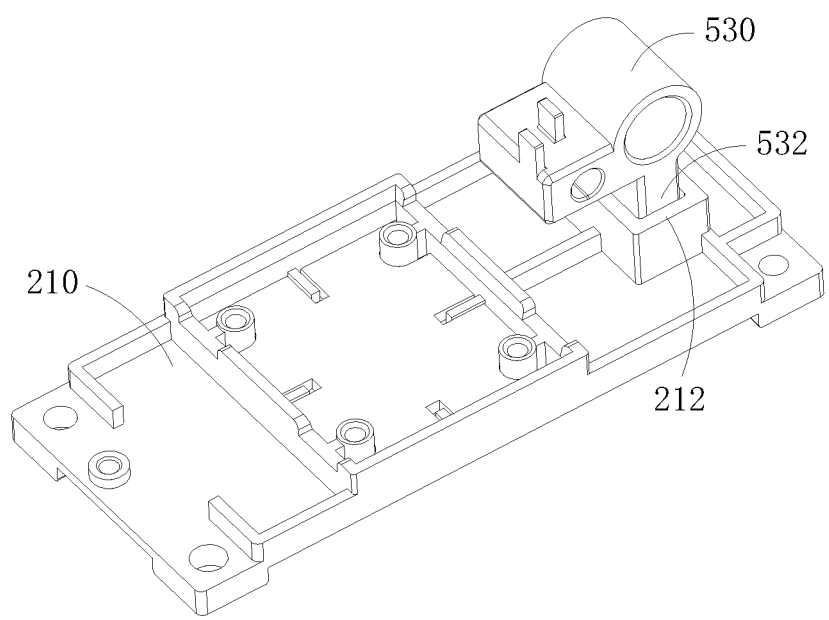
FIG. 13 is a schematic view of cooperation between a nut and a connecting support of a whole machine provided by some embodiments of the present disclosure.

As shown in FIGS. 12 and 13, in some embodiments, the nut 530 is fixed to the display backplate 200 through a whole machine connecting support 210 arranged on the display backplate 200. In order to facilitate replacement and maintenance of parts, and to increase stress area of the display backplate 200, the nut 530 is fixed to the display backplate 200 through the whole machine connecting support 210, and the stress area between the nut 530 and the display backplate 200 is increased through the whole machine connecting support 210, so as to improve support stability.

Furthermore, the nut 530 has a clamping part 532, the whole machine connecting support 210 has a receiving part 212 for receiving the clamping part 532, and the clamping part 532 is fixed to the receiving part 212. In the embodiments, the nut 530 is not a standard member in the traditional sense, but has a special-shaped structure outside the nut 530 on basis of having an internal threaded hole to facilitate fixing of the nut 530. In some embodiments, the nut 530 has a clamping part 532 facing the whole machine connecting support 210; a shape of the receiving part 212 matches a shape of the clamping part 532; in some embodiments, the clamping part 532 is in a cuboid like shape, the receiving part 212 defines a cuboid like groove; the clamping part 532 has two pairs of first driving surfaces 534 and second driving surfaces 536 perpendicular to each other. The two pairs of first driving surfaces 534 and second driving surfaces 536 are connected end to end to form a ring, and cooperate with the groove walls of the receiving part 212 to fix the nut 530. Due to self-locking capability of the lead screw 520, position stability of the first telescopic assembly 500, the second telescopic assembly 600, the first speaker 710, the second speaker 720 and the chassis 300 is realized, and a support effect of the display backplate 200 on the above structure is realized. At the same time, the clamping part 532 and the receiving part 212 can also be reinforced by bonding to further ensure the reliability of the cooperation.

Figure 14:
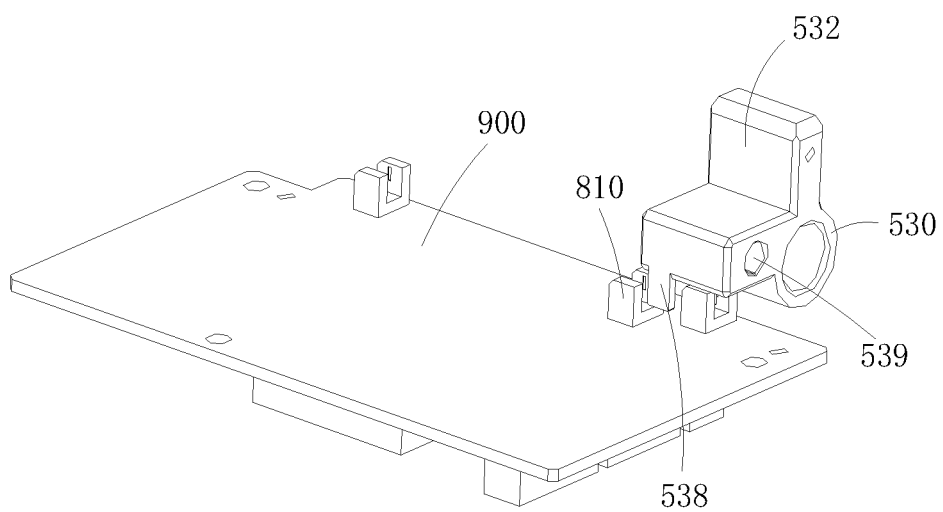
FIG. 14 is a schematic view of cooperation between a nut and a support plate provided by some embodiments of the present disclosure.

In order to improve accuracy and reliability of motion, the nut 530 is also provided with a first retaining rib 538, and the fixing support 310 is provided with a first sensor 810. The first sensor 810 is blocked when moving to a position of the first retaining rib 538. In some embodiments, motion of the fixing support 310 in the first direction is between two ends, namely an initial end and a termination end, two first sensor 810 are respectively arranged at two positions of the fixing support 310 corresponding to the two ends of motion in one-to-one correspondence, and the two first sensors 810 are connected to the control board 410 for transmitting feedback information. In the embodiments, the first sensor 810 adopts an optical sensor, such as an infrared light sensor, a sunlight sensor, an ultraviolet sensor, and the like. The first retaining rib 538 blocks a corresponding first sensor 810 in response to the first sensor 810 at the initial end or termination end moving to the first retaining rib 538. By judging on/off states of the first sensor 810, motion positions of the first speaker 710 and the second speaker 720 are obtained, so as to further ensure the accuracy and reliability of the motion. In some embodiments, the first sensor 810 may not be directly arranged at the fixing support 310, but at a component linked with the fixing support 310, as shown in FIG. 14, in some embodiments, a support plate 900 covered on the fixing support 310. A side of the support plate 900 facing the fixing support 310 is provided with the first sensor 810, and the support plate 900 can be configured to fix the control board 410.

Figure 9:
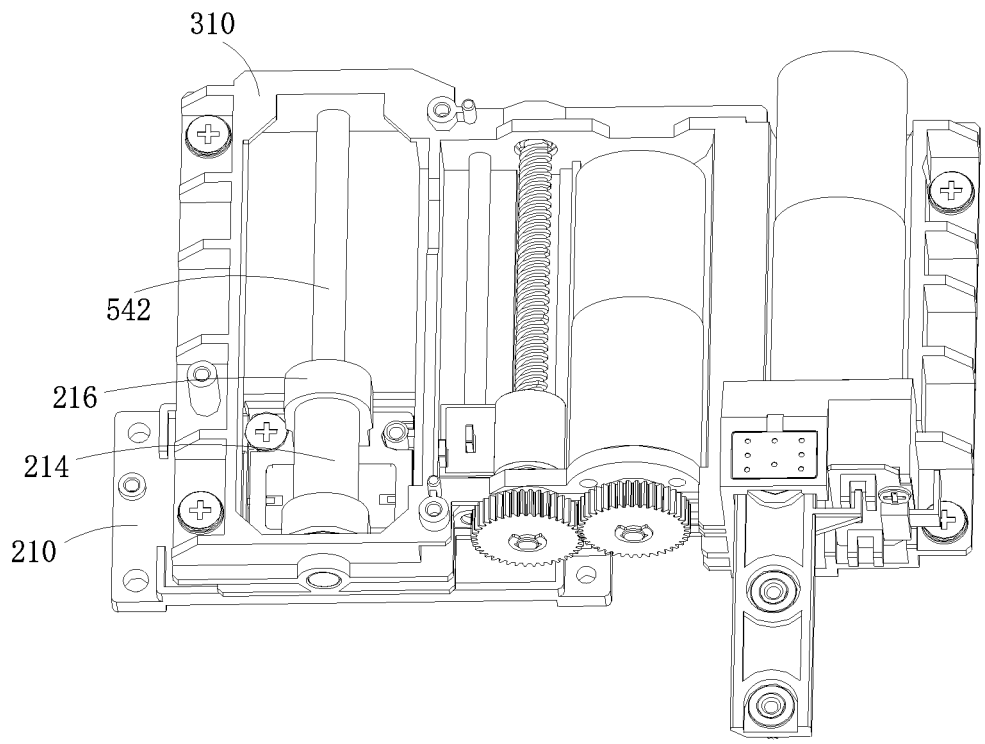
FIG. 9 is another schematic view of a structure shown in FIG. 8.

In order to assist positioning of the nut 530 and avoid shaking of the nut 530, as shown in FIGS. 8, 9 and 12, the first telescopic assembly 500 also includes a positioning shaft 540 extending along the first direction and arranged on the fixing support 310. The nut 530 defines a positioning hole 539 extending along the first direction, and the positioning shaft 540 passes through the positioning hole 539. During motion of the lead screw 520 relative to the nut 530, the positioning shaft 540 restricts rotation of the nut 530, and the positioning shaft 540 also moves relative to the positioning hole 539.

In order to ensure that motion direction of the fixing support 310 and the chassis 300 is more accurate, motion positions of the first speaker 710 and the second speaker 720 are more accurate, the position offset is reduced, and the sound output effect of the first speaker 710 and the second speaker 720 is ensured, in the embodiments, a guide mechanism is also provided to guide the motion direction of the fixing support 310 and the chassis 300. In some embodiments, as shown in FIG. 8, the first telescopic assembly 500 also includes a first shaft 542 extending in the first direction and arranged on the fixing support 310, and the first shaft is a smooth shaft. The whole machine connecting support 210 is fixed with a first bearing 214 extending in the first direction, and the first shaft 542 passes through the first bearing 214. An opening is defined on a side of the fixing support 310 attached to the whole machine connecting support 210 to enable the first bearing 214 arranged in the whole machine connecting support 210 to pass through the opening and be arranged in a space defined by the fixing support 310, so that the first shaft 542 passes through the first bearing 214. The first shaft 542 moves in a direction defined by the first bearing 214 in response to the fixing support 310 driving the first shaft 542 to move. In addition, in order to reduce friction between the first bearing 214 and the first shaft 542, the first bearing 214 can adopt a sliding linear bearing or a rolling linear bearing. These two kinds of linear bearings have small friction, large bearing capacity and long service life, making a motion process of the first bearing 214 along the first shaft 542 more smooth and stable. At the same time, the first bearing 214 is fixed to the whole machine connecting support 210 through a fixing ring 216, so as to ensure support capacity thereof on the fixing support 310, the chassis 300 and the motion module 400.

Figure 15:
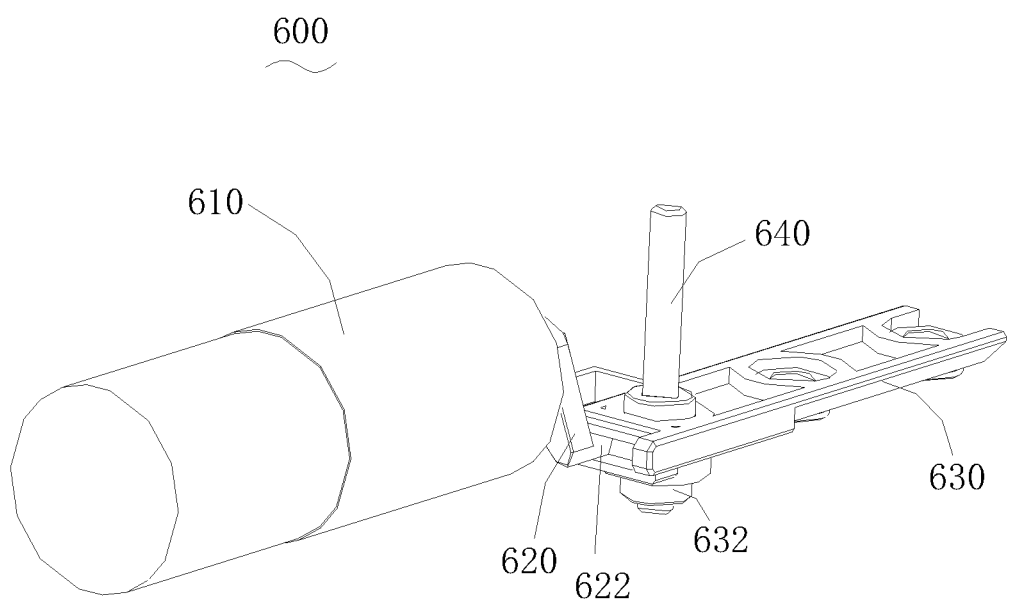
FIG. 15 is a structural schematic view of a second telescopic assembly provided by some embodiments of the present disclosure.

As shown in FIG. 15, in some embodiments, the second telescopic assembly 600 includes a second motor 610 arranged on the fixing support 310, a cam 620 driven by the second motor 610, a driving rod 622 fixed on the cam 620 and extending parallel to an axle direction of the cam 620, and a motion support 630 connected with the driving rod 622. The second speaker 720 is fixed to the motion support 630. When the second motor 610 drives the cam 620 to rotate, the driving rod 622 drives the motion support 630 and the second speaker 720 to move in the second direction. In some embodiments, the motion support 630 may define a receiving groove for receiving and fixing the driving rod 622, and the driving rod 622 is fixed in the receiving groove by bonding, welding or mechanical cooperation. When the cam 620 rotates, the cam 620 can drive the driving rod 622 to move in the second direction, the driving rod 622 drives the motion support 630 to move in the second direction, and then the motion support 630 drives the second speaker 720 to move in the second direction, until the sound output surface of the second speaker 720 is flush with the display screen 100. With this arrangement, a thrust generated by the second motor 610 is transmitted through the driving rod 622 on the cam 620 with high transmission efficiency and without accumulating errors generated by the motion module 400, so as to avoid jamming and efficiency reduction of the motion module 400. At the same time, the motion support 630, the second speaker 720 and the driving rod 622 form a component in principle similar to a lever, and are capable of self-locking when not subjected to much force.

Furthermore, the second motor 610 has a second output shaft. In order to prevent looseness and failure of cooperation between the second output shaft and the cam 620, the way of unconventional hole and unconventional shaft can be used to ensure stability and reliability of rotation of the cam 620 relative to the second output shaft. In some embodiments, at least part of the second output shaft is a third non-circular shaft, and the cam 620 defines a third non-circular hole matched with the third non-circular shaft. When the third non-circular shaft and the third non-circular hole match with each other, there will be no relative rotation between the third non-circular shaft and the third non-circular hole ensuring the reliability of the cooperation. Non-circular shapes can be D-shaped, square, triangular, and other irregular shapes. In the embodiments, the third non-circular shaft adopts a D-shaped shaft, and the third non-circular hole adopts a D-shaped hole.

In order to reduce looseness of cooperation between the second output shaft and cam 620 and falling off of the cam 620, locking between the second output shaft and cam 620 can be realized by using a circlip. In some embodiments, a side of the second output shaft extending out of the cam 620 defines a third clamping groove, the third clamping groove is matched with a third circlip, and the third circlip butts against an end face of the cam 620. It can be understood that the third circlip butts against a surface of the cam 620 away from the second motor 610. The third circlip can be C-shaped, E-shaped or U-shaped. In this embodiment, the third circlip adopts a E-shaped circlip.

In order to provide good guidance for the motion of the second speaker 720 along the second direction and improve stability during operation, as shown in FIG. 15, the second telescopic assembly 600 also includes a second shaft 640 extending along the second direction and arranged on the fixing support 310 and the second shaft is a smooth shaft. The motion support 630 is provided with a second bearing 632 extending along the second direction. The second shaft 640 passes through the second bearing 632. In some embodiments, the fixing support 310 defines an accommodation cavity with two walls arranged spaced apart from each other and perpendicular to the second direction, the second shaft 640 is fixed between the two walls, and the motion support 630 is provided with a second bearing 632 extending along the second direction, that is, an extension direction of a hole axis of the second bearing 632 is the second direction. The second shaft 640 passes through the second bearing 632. When the second motor 610 drives the cam 620 to rotate, the cam 620 drives the second bearing 632 to make a reciprocating linear motion along the second shaft 640 through the motion support 630. At the same time, the cam 620 drives the second speaker 720 to make a reciprocating linear motion along the second direction through the motion support 630. Rotation of the cam 620 is converted into linear motion of the second speaker 720 with cooperation between the second bearing 632 and the second shaft 640. It can be understood that at this time, due to limitations of the second bearing 632 and the second shaft 640, the cam 620 can only rotate a certain angle, such as 100 degrees, 110 degrees and 120 degrees, which can be adjusted according to the moving distance of the second speaker 720 in the second direction. In addition, in order to reduce friction between the second bearing 632 and the second shaft 640, the second bearing 632 can adopt a sliding linear bearing or a rolling linear bearing. These two kinds of linear bearings have small friction, large bearing capacity and long service life, making a motion process of the second bearing 632 along the second shaft 640 more smooth and stable.

Figure 10:
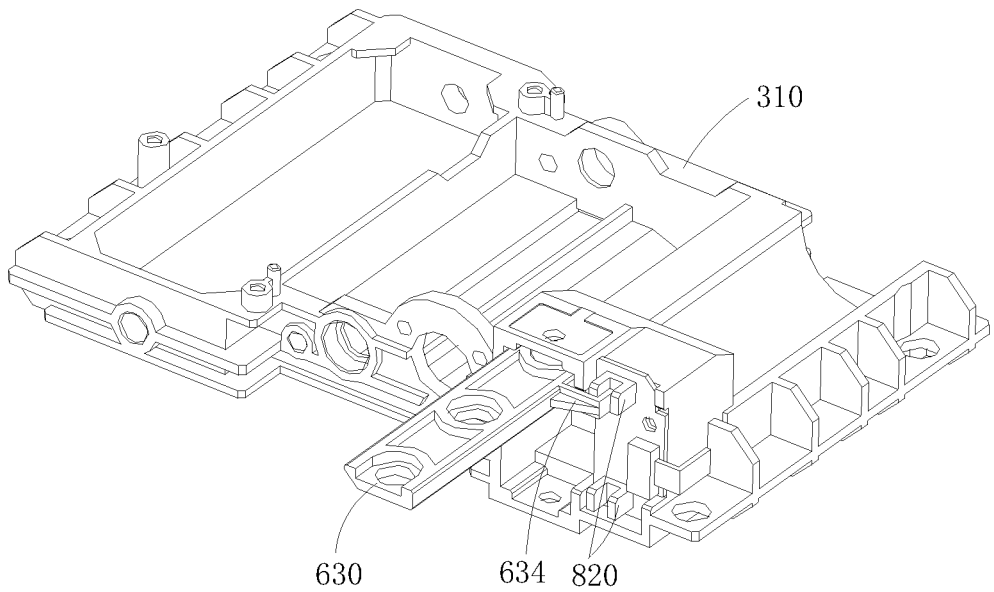
FIG. 10 is a schematic view of a fixing support provided by some embodiments of the present disclosure.

In order to improve the accuracy and reliability of motion, as shown in FIG. 10, the motion support 630 is provided with a second retaining rib 634, the fixing support 310 is provided with a second sensor 820, and the second retaining rib 634 blocks the second sensor 820 when moving to a position of the second sensor 820. In some embodiments, motion of the second speaker 720 moving in the second direction is between two ends, namely an initial end and a termination end, two second sensors 820 are respectively arranged at two positions of the fixing support 310 corresponding to the two ends of motion in one-to-one correspondence, and the two second sensors 820 are both connected to the control board 410 for transmitting feedback information. In the embodiments, the second sensor 820 adopts an optical sensor, such as an infrared light sensor, a sunlight sensor, an ultraviolet sensor, and the like. When the second retaining rib 634 moves to the second sensor 820 at the initial end or the termination end, a corresponding second sensor 820 is blocked. By judging on/off states of the second sensor 820, motion positions of the second speaker 720 can be obtained, so as to further ensure the accuracy and reliability of the motion.

In order to reduce vibration transmission, make up for mass production dimensional error and ensure mass production of products, a buffer 650 is arranged at a connection between the motion support 630 and the second speaker 720. As shown in FIG. 8, in some embodiments, the motion support 630 defines a mounting hole, and the motion support 630 and the second speaker 720 are locked and fixed by a screw/bolt passing through the mounting hole. The buffer 650 can adopt a rubber ring, a rubber pad or a silicone sleeve. If a gasket or washer type buffer is used, the gasket or washer type buffer 650 can be arranged at a butting surface between the screw/bolt and the motion support 630 or the second speaker 720. If a sleeve type buffer 650 is used, the sleeve type buffer 650 can be arranged in a circumferential direction of the screw/bolt.

In addition, connection at other positions can also be provided with a buffer to improve damping effect of the whole machine, ensure the stability of motion transmission, solve poor motion caused by production and manufacturing errors, reduce the transmission of vibration and reduce noise of mechanism motion. In some embodiments, the buffers can be arranged at the connection between the fixing support 310 and the chassis 300, connection between the first speaker 710 and the chassis 300, and connection between the whole machine connecting support 210 and the display backplate 200. At the same time, vibration generated by the loudspeakers in the first speaker 710 and the second speaker 720 during operation is also reduced, and resonance of the housing is reduced.

The technical features of the above embodiments can be combined arbitrarily. In order to make the description concise, all possible combinations of respective technical features in the above embodiments are not described. However, as long as there is no contradiction between the combination of these technical features, it should be considered as the scope of the description.

The above-mentioned examples only express several embodiments of the present disclosure, and their descriptions are relatively specific and detailed, but they should not be construed as limiting the scope of present disclosure. It should be noted that, for those of ordinary skill in the art, several modifications and improvements may be made without departing from the concept of the present disclosure, which are all within the scope of protection of the present disclosure. Therefore, the scope of protection of the present disclosure patent shall be subject to the appended claims.

What is claimed is:
1. A flat-panel display device, comprising:
a display screen;
a display backplate stacked on the display screen;
a chassis slidably arranged on the display backplate;
a fixing support arranged on the chassis;
a motion module arranged on the chassis; wherein the motion module comprising a first telescopic assembly and a second telescopic assembly arranged on the fixing support, wherein a telescopic direction of the first telescopic assembly is defined as a first direction, a telescopic direction of the second telescopic assembly is defined as a second direction, and the first direction is perpendicular to the second direction;
a first speaker arranged on the chassis; and
a second speaker connected to the second telescopic assembly;
wherein the first telescopic assembly is matched with the display backplate, and the first telescopic assembly is configured to drive the chassis, the first speaker, the second speaker and the second telescopic assembly to move back and forth in the first direction relative to the display backplate; and
the second telescopic assembly is configured to drive the second speaker to move back and forth in the second direction relative to the display backplate and the first speaker.

2. The flat-panel display device as claimed in claim 1, wherein the first telescopic assembly comprises a first motor arranged on the fixing support, a lead screw arranged on the fixing support and driven by the first motor, and a nut matched with the lead screw; wherein the nut is fixed on the display backplate; and the lead screw moves in the first direction relative to the nut in response to the first motor driving the lead screw to rotate.

3. The flat-panel display device as claimed in claim 2, wherein the first motor has a first output shaft and a first gear driven by the first output shaft; the first telescopic assembly comprises a second gear arranged on the lead screw; and the first gear is meshed with the second gear.

4. The flat-panel display device as claimed in claim 3, wherein at least part of the first output shaft is a first non-circular shaft, and the first gear defines a first non-circular hole matched with the first non-circular shaft; at least part of the lead screw is a second non-circular shaft, and the second gear defines a second non-circular hole matched with the second non-circular shaft.

5. The flat-panel display device as claimed in claim 4, wherein a side of the first output shaft extending out of the first non-circular hole defines a first clamping groove, a first circlip is arranged within and matched with the first clamping groove, and the first circlip butts against an end face of the first gear; a side of the lead screw extending out of the second non-circular hole defines a second clamping groove, a second circlip is arranged within and matched with the second clamping groove, and the second circlip butts against an end face of the second gear.

6. The flat-panel display device as claimed in claim 2, further comprising a whole machine connecting support arranged on the display backplate; wherein the nut is fixed to the display backplate through the whole machine connecting support.

7. The flat-panel display device as claimed in claim 6, wherein the nut has a clamping part, the whole machine connecting support has a receiving part for receiving the clamping part, and the clamping part is fixed to the receiving part.

8. The flat-panel display device as claimed in claim 2, wherein the nut is further provided with a first retaining rib, the fixing support is provided with a first sensor, and the first sensor is blocked by the first retaining rib when moving to a position of the first retaining rib.

9. The flat-panel display device as claimed in claim 2, wherein the first telescopic assembly further comprises a positioning shaft extending along the first direction and arranged on the fixing support, the nut defines a positioning hole extending along the first direction, and the positioning shaft passes through the positioning hole.

10. The flat-panel display device as claimed in claim 2, wherein the first telescopic assembly further comprises a first shaft extending along the first direction and arranged on the fixing support, the whole machine connecting support is fixed with a first bearing extending along the first direction, and the first shaft passes through the first bearing.

11. The flat-panel display device as claimed in claim 1, wherein the second telescopic assembly comprises a second motor arranged on the fixing support, a cam driven by the second motor, a driving rod fixed on the cam and extending parallel to an axle direction of the cam, and a motion support connected with the driving rod; the second speaker is fixed to the motion support, the driving rod drives the motion support and the second speaker to move along the second direction in response to the second motor driving the cam to rotate.

12. The flat-panel display device as claimed in claim 11, wherein the second telescopic assembly further comprises a second shaft extending along the second direction and arranged on the fixing support, the motion support is provided with a second bearing extending along the second direction, and the second shaft passes through the second bearing.

13. The flat-panel display device as claimed in claim 11, wherein a buffer is arranged at a connection between the motion support and the second speaker.

14. The flat-panel display device as claimed in claim 11, wherein the motion support is provided with a second retaining rib, the fixing support is provided with a second sensor, and the second retaining rib blocks the second sensor when moving to a position of the second sensor.

15. The flat-panel display device as claimed in claim 1, wherein the motion module comprises a plurality of motion modules, each of the plurality of motion modules is configured with a control board to drive a corresponding motion module.

16. A sound generating device, comprising:
a backplate;
a chassis slidably arranged on the backplate, the chassis being provided with a fixing support;
a motion module arranged on the chassis, the motion module comprising a first telescopic assembly and a second telescopic assembly arranged on the fixing support; wherein a telescopic direction of the first telescopic assembly is defined as a first direction, a telescopic direction of the second telescopic assembly is defined as a second direction, and the first direction is perpendicular to the second direction;
a first speaker arranged on the chassis; and
a second speaker connected to the second telescopic assembly;
wherein the first telescopic assembly is matched with the backplate, and the first telescopic assembly is configured to drive the chassis, the first speaker, the second speaker and the second telescopic assembly to move back and forth in the first direction relative to the backplate; and
the second telescopic assembly is configured to drive the second speaker to move back and forth in the second direction relative to the backplate and the first speaker;
wherein the first telescopic assembly comprises a first motor arranged on the fixing support, a lead screw arranged on the fixing support and driven by the first motor, and a nut matched with the lead screw and fixed on the backplate; and the lead screw moves in the first direction relative to the nut in response to the first motor driving the lead screw to rotate;
the second telescopic assembly comprises a second motor arranged on the fixing support, a cam driven by the second motor, a driving rod fixed on the cam and extending parallel to an axle direction of the cam, and a motion support connected with the driving rod; the second speaker is fixed to the motion support, the driving rod drives the motion support and the second speaker to move along the second direction in response to the second motor driving the cam to rotate.

17. An electronic device, comprising:
a flat-panel display device, comprising:
a display backplate;
a display screen stacked on the display backplate; and
a chassis slidably arranged on the display backplate and between the display screen and the display backplate;

a motion module arranged on the chassis and comprising a first telescopic assembly and a second telescopic assembly;

a first speaker arranged on the chassis; and a second speaker connected to the second telescopic assembly;

wherein the first telescopic assembly is configured to drive the chassis, the first speaker, the second speaker and the second telescopic assembly to move back and forth in a first direction relative to the display backplate; and the second telescopic assembly is configured to drive the second speaker to move back and forth in a second direction relative to the display backplate and the first speaker; and the first direction is perpendicular to the second direction.

18. The electronic device as claimed in claim 17, further comprising a fixing support arranged on the chassis; wherein the first telescopic assembly comprises a first motor arranged on the fixing support, a lead screw arranged on the fixing support and driven by the first motor, and a nut matched with the lead screw; wherein the nut is fixed on the display backplate, and the lead screw moves in the first direction relative to the nut in response to the first motor driving the lead screw to rotate.

19. The electronic device as claimed in claim 18, wherein the first motor has a first output shaft and a first gear driven by the first output shaft; the first telescopic assembly comprises a second gear arranged on the lead screw; and the first gear is meshed with the second gear.

20. The electronic device as claimed in claim 18, wherein the second telescopic assembly comprises a second motor arranged on the fixing support, a cam driven by the second motor, a driving rod fixed on the cam and extending parallel to an axle direction of the cam, and a motion support connected with the driving rod; the second speaker is fixed to the motion support, the driving rod drives the motion support and the second speaker to move along the second direction in response to the second motor driving the cam to rotate.

* * * * *